US009878752B2

(12) United States Patent
Schaufeld et al.

(10) Patent No.: US 9,878,752 B2
(45) Date of Patent: Jan. 30, 2018

(54) FOLDING ANTI-THEFT DEVICE

(71) Applicant: ALTOR LOCKS, LLC, Glen Allen, VA (US)

(72) Inventors: Karen Schaufeld, Leesburg, VA (US); Dylan Cato, Bethlehem, PA (US)

(73) Assignee: Altor Locks, LLC, Glen Allen, VA (US)

( * ) Notice: Subject to any disclaimer, the term of this patent is extended or adjusted under 35 U.S.C. 154(b) by 209 days.

(21) Appl. No.: 14/927,995

(22) Filed: Oct. 30, 2015

(65) Prior Publication Data

US 2017/0120977 A1    May 4, 2017

(51) Int. Cl.
| | |
|---|---|
| *E05B 71/00* | (2006.01) |
| *B62H 5/14* | (2006.01) |
| *E05B 67/10* | (2006.01) |
| *E05B 67/28* | (2006.01) |
| *E05B 67/36* | (2006.01) |
| *E05B 73/00* | (2006.01) |
| *B62H 5/00* | (2006.01) |
| *E05B 67/00* | (2006.01) |
| *E05B 15/16* | (2006.01) |

(52) U.S. Cl.
CPC .............. *B62H 5/147* (2013.01); *B62H 5/00* (2013.01); *B62H 5/003* (2013.01); *E05B 15/1614* (2013.01); *E05B 67/003* (2013.01); *E05B 67/10* (2013.01); *E05B 67/28* (2013.01); *E05B 67/36* (2013.01); *E05B 71/00* (2013.01); *E05B 73/0005* (2013.01)

(58) Field of Classification Search
CPC .......... B62H 5/147; B62H 5/00; B62H 5/003; E05B 67/10; E05B 67/28; E05B 67/36; E05B 15/1614; E05B 67/003; E05B 71/00; E05B 73/0005; Y10T 403/32081; Y10T 403/32951; Y10T 403/32959; Y10T 403/32967; Y10T 403/32; Y10T 403/32008; Y10T 403/75; F16C 11/04; F16C 17/10; F16B 5/04
USPC .............. 70/14, 18, 30, 49, 53, 58, 417, 233
See application file for complete search history.

(56) References Cited

U.S. PATENT DOCUMENTS

| | | | |
|---|---|---|---|
| 3,696,647 A | * | 10/1972 | Balicki ................. E05B 67/003 70/417 |
| 3,747,376 A | | 7/1973 | White |
| 3,908,414 A | | 9/1975 | Lee |
| 3,933,015 A | * | 1/1976 | Balicki ................. E05B 67/003 70/18 |

(Continued)

FOREIGN PATENT DOCUMENTS

DE    202015104106 U1 *  9/2015

OTHER PUBLICATIONS

Abus Folding Lock, Awesome Stuff: The Awesomer, 2014, Awesomer Media, Chicago.

(Continued)

*Primary Examiner* — Lloyd Gall

(57) ABSTRACT

The invention relates to an anti-theft device that is both highly resistant to attack by hand-carried bolt cutters and saw blades while also exhibiting a weight suitable for use with bicycles. The device is made with a plurality of interlinked titanium alloy arm members, each of which exhibits a hardness of HRC 30 or more and a cross-sectional distance of 8 mm or more.

10 Claims, 7 Drawing Sheets

(56) References Cited

U.S. PATENT DOCUMENTS

| | | | |
|---|---|---|---|
| 4,561,272 A * | 12/1985 | Goldstein | E05B 15/1614 428/627 |
| 4,810,141 A * | 3/1989 | Rainville | F16B 19/1054 411/38 |
| 5,092,142 A | 3/1992 | Zane et al. | |
| 5,475,993 A | 12/1995 | Kuo | |
| 5,487,285 A | 1/1996 | Leichel et al. | |
| 5,732,577 A | 3/1998 | Okada et al. | |
| 5,868,013 A * | 2/1999 | Julien | B60R 25/023 70/38 A |
| 5,913,906 A | 6/1999 | Strocchi | |
| 6,820,448 B1 | 11/2004 | Hsieh | |
| 7,437,898 B2 | 10/2008 | Su | |
| D579,756 S | 11/2008 | Hentschel et al. | |
| 7,481,084 B1 * | 1/2009 | Wu | E05B 67/003 70/18 |
| 7,670,077 B2 * | 3/2010 | Jan | F16C 11/0623 285/262 |
| 7,712,339 B2 * | 5/2010 | Hentschel | E05B 37/025 70/14 |
| 7,922,418 B2 * | 4/2011 | Baker | F16C 11/04 360/265.2 |
| 8,118,515 B2 * | 2/2012 | Goerg | B60G 7/02 280/93.512 |
| 8,398,331 B2 * | 3/2013 | Esdaile | E04H 15/34 403/385 |
| 8,621,898 B2 | 1/2014 | Chen | |
| 8,881,559 B1 | 11/2014 | Chang | |
| 9,222,504 B2 * | 12/2015 | Schaffer | B60N 2/4435 |
| 2002/0121055 A1 * | 9/2002 | Englehart | E04B 2/702 52/233 |
| 2003/0108386 A1 * | 6/2003 | Liu | E05D 5/0246 403/408.1 |
| 2006/0018709 A1 * | 1/2006 | Doerr | F16B 5/065 403/408.1 |
| 2006/0232123 A1 * | 10/2006 | Ross | A63C 17/223 301/5.7 |
| 2007/0231059 A1 * | 10/2007 | Mullaney | A61B 17/645 403/52 |
| 2008/0187395 A1 * | 8/2008 | Goerg | B60G 7/02 403/365 |
| 2009/0087254 A1 * | 4/2009 | Bodtker | F16D 3/2052 403/162 |
| 2011/0219827 A1 * | 9/2011 | Loughlin | B62H 3/02 70/49 |
| 2011/0219829 A1 * | 9/2011 | Trunek | B62H 5/003 70/58 |
| 2012/0049679 A1 * | 3/2012 | Petrenko | F16C 17/10 310/90 |
| 2012/0063839 A1 * | 3/2012 | Mo | F16B 7/182 403/84 |
| 2014/0023429 A1 * | 1/2014 | Lee | E04H 15/50 403/161 |
| 2014/0109631 A1 * | 4/2014 | Asquith | E05B 45/005 70/15 |
| 2014/0260439 A1 * | 9/2014 | Dallaire | B62H 5/00 70/15 |
| 2014/0360232 A1 * | 12/2014 | Al-Kahwati | G07C 9/00571 70/14 |
| 2014/0360233 A1 | 12/2014 | Muller et al. | |
| 2015/0082843 A1 | 3/2015 | Smith | |
| 2016/0024818 A1 * | 1/2016 | Allen | E05B 67/003 70/30 |
| 2016/0250509 A1 * | 9/2016 | Todokoro | A63B 9/00 403/53 |

OTHER PUBLICATIONS

ABUS Folding Locks product flyer, 2015, ABUS August Bremicker Söhne KG, Germany.
Aliexpress foldable bike lock Reviews, 2010-2015, AliExpress. com, Alibaba, Hangzhou, China.
AZO Materials, Titanium Alloys—Physical Properties, Aug. 11, 2015, http://www.azom.com/article.aspx?articleid=1341#_Tensile_Strength, Cheshire, UK.
Berger, Lockdown: 10 Solutions for Securing Your Bike, The Guide to Life, May 20, 2015, pp. 1-10, vol. 2, Gear Patrol, New York.
Cherrybuck® Titanium Shear Pin specifications, Sep. 24, 2009, Cherry Aerospace, Santa Ana, CA.
RMI Titanium Company, Titanium Alloy Guide, 2000, RTI International Metals, Inc., Niles, OH.
Segmented Titanium Bike Lock Project, 2014.

* cited by examiner

FOLDING ANTI-THEFT DEVICE

FIELD OF THE INVENTION

The present invention relates to an antitheft device that is particularly well suited for use with wheels, e.g., bicycles, motorcycles and automobiles having at least one wheel that can be secured by an unbreakable device passing therethrough.

BACKGROUND OF THE INVENTION

The loss of a bicycle to theft is an economic loss as well as a substantial inconvenience to the now-stranded cyclist. The loss of a favorite, customized or bicycle of exotic manufacture can also represent a substantial emotional loss from the time and energy associated with selecting just the right combination of features for the rider.

A number of anti-theft devices have been proposed that are intended to secure a bicycle or motorcycle and thereby prevent or impede theft. See, e.g., U.S. Pat. Nos. 3,747,376; 3,908,414; 5,092,142; 5,475,993; 5,487,285; 5,732,577; 5,913,906; 6,820,448; 7,437,898; 7,481,084; 7,712,339; 8,621,898; 8,881,559; US 2014/036233; and U.S. Pat. No. D579,756.

Despite such devices, those individuals with intent continue to find methods and techniques to defeat such anti-theft devices. Many of those techniques include the use of a handheld bolt cutter with hardened cutting jaws, a portable angle grinder or even a conventional hacksaw to cut through the antitheft device. Such cutters fail the target material in tension, but they induce the tension via the lateral component of the wedge-shaped blades. This means that a bolt cutter is a battle between the compressive strength of the cutting blades versus the compressive strength of the locking device. If both have near-equal hardness, it is difficult to predict which one will win. The battle becomes one of the quantum of pressure that can be applied on the device by the cutting jaws.

Typical, commercially available bolt cutters exhibit hardened blades of about 62 HRC and can cut 6 mm 48 HRC wire but only HRC 19 rods of 11 mm. This means why traditional chains of interlinked, connected wire stock, even if hardened and/or made of unique alloys, must be made so large and heavy: the bolt cutter acts on the individual wire stock diameter, not the overall chain width.

Surveillance videos show that members of the public rarely question or interfere with a thief in the act of breaking or cutting through a bicycle locking device, even when obviously using a bolt cutter or cut-off saw. Thus, cyclists cannot rely on help from passersby who might witness acts of theft in progress. The locking device must do more than just buy time—it must actually work.

It would be desirable to have an anti-theft device that was made from a material that could not be cut, melted, ground or drilled with handheld tools.

Some antitheft devices, such as the popular U-shaped devices, are defeated because they are large enough to secure only one wheel and the bike frame to a support. This leaves the other wheel vulnerable to removal and theft unless two such devices are carried and used together. This would double the cost and inconvenience of securing a bicycle against theft.

It would be desirable to have an anti-theft device that was sufficiently long in reach to secure both wheels and the frame to a stationary support.

Many locking systems are designed with a plurality of flat leg segments joined at a riveted joint that allows one leg segment to rotate and stack closely with the adjacent segments so as to fold into a compact unit that can be stored in a seat bag or on a frame clip. Such design considerations are visually appealing to consumers because they are easy to carry. Unfortunately, all of the currently known designs of this type are made from some version of steel, hardened steel or hard aluminum.

While titanium may have been suggested for bicycle locks (see, e.g., US Patent Publication Nos. 2014/0109631 and 2014/0260439), no specific grade or type of titanium is specified.

Titanium is available in various grades, based on the material properties. Commercially pure titanium is available in increasing hardness from Grade 1 to grade 4. These grades of titanium can be formed, engraved with conventional machines, and cut so that they can even be used as rings and similar jewelry. Stronger grades of titanium are alloys that have been mixed with one or more Group III-Group VIII materials (e.g., vanadium, molybdenum, nickel, ruthenium, palladium, chromium, zirconium, molybdenum, and aluminum) to increase their hardness. Sometimes referred to as "aircraft grade" titanium alloys, such materials are so hard that they are almost impossible to engrave, form or cut.

SUMMARY OF THE INVENTION

It is an objective of the invention to provide an antitheft device that cannot be cut by handheld bolt cutters.

It is further an objective to provide a portable antitheft device that can be carried on or by a bicycle without materially compromising the weight and handling of the bicycle in transit when so laden.

In accordance with these and other objectives of the invention that will become apparent from the description herein, an antitheft device according to the invention comprises an antitheft device comprising a plurality of interlinked titanium alloy arm members, each of which exhibits a hardness of HRC 30 or more and a cross sectional distance of 8 mm or more.

The security device according to the invention is sufficiently light to be suitable for use with and carried on a bicycle while also exhibiting a high degree of resistance to breach by bolt cutters, saws and angle grinders. Such robust resistance makes the device also suitable for use with motorcycles and automobiles.

DETAILED DESCRIPTION OF THE INVENTION

Figure 1:
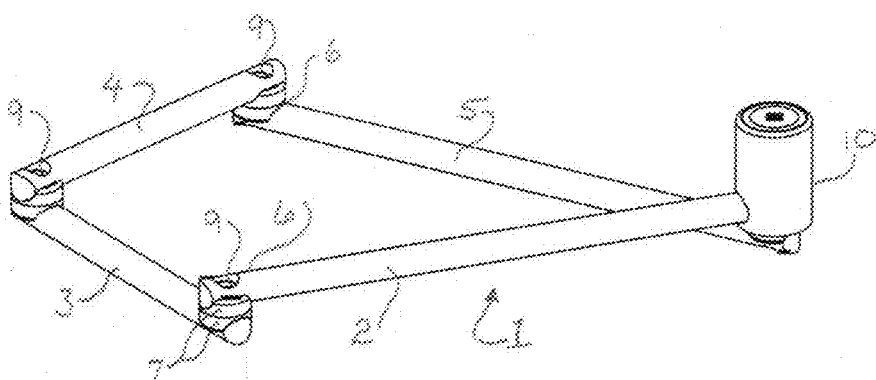
FIG. 1 shows an isometric view of an antitheft device according to the invention with two extension members, a locked arm and a lockable arm.

The present device uses a plurality of connected extension arm members (the number of which determine the overall length available of the device), a locking arm that has a locking device permanently connected thereto, and a lockable arm with a bore through the leading edge thereof. In use, the leading edge of the lockable arm is inserted into a transverse opening in the lock housing and a leading rod member on the lock device is secured into the lock housing so that it passes through the bore in the leading edge of the lockable arm.

For the present invention, a hard titanium alloy is preferred. One way to measure the hardness of titanium or alloys thereof is with a Rockwell test. Such a test determines the hardness by measuring the depth of penetration of an indenter under a large load compared to the penetration made by a preload. There are different scales, denoted by a single letter, that use different loads or indenters. The result is a dimensionless number noted as HRA, HRB, HRC, etc., where the last letter is the respective Rockwell scale. See Table 1.

TABLE 1

Rockwell Hardness Scales

| Scale | Abbreviation | Load (kg$_F$) | Indenter |
|---|---|---|---|
| A | HRA | 60 | 120° diamond spheroconical[†] |
| B | HRB | 100 | 1/16-inch-diameter (1.588 mm) steel sphere |
| C | HRC | 150 | 120° diamond spheroconical |
| D | HRD | 100 | 120° diamond spheroconical |
| E | HRE | 100 | 1/8-inch-diameter (3.175 mm) steel sphere |
| F | HRF | 60 | 1/16-inch-diameter (1.588 mm) steel sphere |
| G | HRG | 150 | 1/16-inch-diameter (1.588 mm) steel sphere |

Materials tested with the HRC protocol are generally harder than those tested with the HRB protocol. There is, however, some overlap between the upper end of the HRB (100 kg) scale and the lower end of the HRC (150 kg) scale, e.g., an HRB (100 kg) of 97 corresponds generally to an HRC (150 kg) of about 20, and an HRB (100 kg) of 120 corresponds with an HRC (150 kg) of about 55 for non-austenitic steels. (See http://www.woodcousa.com/bhn.pdf.) HRC values of less than 20 are said to have questionable accuracy.

Titanium alloys having a hardness of HRC 30 or more are preferred for use in the present invention, e.g., titanium exhibiting HRC (150 kg) hardness within the range of 30-68 or HRB within the range of 105-120 or more. Even more preferably, the titanium hardness is within the range of HRC (150 kg) 33-50. Such high hardness is generally beyond the ability of hand tools to cut, saw or grind away. Table 1 lists suitable materials and includes unalloyed titanium by way of comparison.

TABLE 2

| Material Name | HRC |
|---|---|
| Titanium Grade 7 | 11.0 |
| Titanium Grade 7, Annealed | 11.0 |
| Titanium Grade 12 | 11.0 |
| Titanium Grade 18 Ti-3Al-2.5V-0.05Pd | 15.0 |
| Titanium Grade 3 | 16.0 |
| Titanium Grade 4 | 23.0 |
| Titanium Grade 4, Annealed | 23.0 |
| Titanium Ti-3Al-2.5V (Grade 9), alpha annealed | 24.0 |
| ATI Allvac ® 3-2.5 Titanium Alloy, Heat Treatment: 704° C. (1300° F.) Anneal | 24.0 |
| ATI Allegheny Ludlum Grade 9 Titanium (UNS R56320) | 25.0 |
| ATI Allegheny Ludlum Grade 18 Titanium (UNS R56322) | 25.0 |
| Titanium Grade 3, Annealed | 26.0 |
| ATI Allvac ® 6-2-4-2-Si UNS R54620 modified Titanium Alloy | 28.0 |
| Titanium Ti-6Al-2Nb-1Ta-0.8Mo (Ti-621/0.8), as-rolled | 30.0 |
| Titanium Ti-6Al-2Nb-1Ta-0.8Mo (Ti-621/0.8), Alpha-Annealed | 30.0 |
| Titanium Ti-6Al-2Nb-1Ta-0.8Mo (Ti-621/0.8), STA-1 | 30.0 |
| Titanium Ti-6Al-2Nb-1Ta-0.8Mo (Ti-621/0.8), STA | 30.0 |
| Titanium Ti-6Al-2Nb-1Ta-1Mo | 30.0 |
| Titanium Ti-6Al-2Nb-1Ta-1Mo, Annealed | 30.0 |
| Titanium Ti-13V-11Cr-3Al (Ti-13-11-3) Solution Treated | 30.0 |
| ATI Allvac ® 6-4ELI Titanium Alloy, Heat Treatment: 704° C. (1300° F.) Anneal | 30.0 |
| ATI Allegheny Ludlum Grade 23 (6-4 ELI) Titanium (UNS R56401) | 30.0 |
| Titanium Ti-15V-3Cr-3Al-3Sn ST 850° C. (1560° F.), Aged 545° C. | 31.0 |
| Titanium Ti-6Al-2Sn-4Zr-2Mo (Ti-6-2-4-2), Duplex Annealed | 32.0 |
| Titanium IMI 829 (Ti-5.5Al-3.5Sn-3Zr-1Nb-0.25Mo-0.3Si) | 32.0 |
| Titanium Ti-10V-2Fe-3Al (Ti 10-2-3), Anneal 1 hr. 760° C. | 32.0 |
| Titanium Beta C (Ti-3Al-8V-6Cr-4Mo-4Zr) Solution Treated 815° C. | 32.0 |
| ATI Allvac ® 6-4 Titanium Alloy, Heat Treatment: 704° C. (1300° F.) Anneal | 32.0 |
| ATI Allvac ® 6-7 UNS R56700 Titanium Alloy | 32.0 |
| ATI Allvac ® Grade 15-3-3-3 UNS R58153 Titanium Alloy | 32.0 |
| ATI Allvac ® 38-644 UNS R58640 Titanium Alloy | 32.0 |
| Titanium Ti-5Al-2.5Sn, ELI, Annealed | 33.0 |
| Titanium Ti-6Al-2Sn-4Zr-2Mo-0.1Si; Duplex Annealed | 34.0 |
| Titanium Ti-6Al-2Sn-4Zr-2Mo (Ti-6-2-4-2), Sheet | 34.0 |
| Titanium Ti-13V-11Cr-3Al; (Ti-13-11-3) Annealed 800° C., 30 min. | 34.0 |
| Titanium Ti-8Mn, Annealed | 34.0 |

TABLE 2-continued

| Material Name | HRC |
|---|---|
| Titanium Ti-7Al-4Mo Annealed | 34.0 |
| ATI Allvac ® 6-2-4-2 Titanium Alloy, Heat Treatment: 982° C. (1800° F.) + Age | 34.0 |
| Titanium Ti-8Al-1Mo-1V (Ti-8-1-1) Duplex Anneal | 35.0 |
| Titanium IMI 834 | 35.0 |
| Titanium Ti-6Al-4V ELI (Grade 23), Annealed | 35.0 |
| ATI Allvac ® 8-1-1 Titanium Alloy, Heat Treatment: 982° C. (1800° F.) + Age | 35.0 |
| ATI Allvac ® 6-6-2 Titanium Alloy, Heat Treatment: 718° C. (1325° F.) Anneal | 35.0 |
| ATI Allegheny Ludlum Grade 5 Titanium 6Al-4V (UNS R56400) | 35.0 |
| Titanium Ti-5Al-2.5Sn (Grade 6) | 36.0 |
| Titanium Ti-8Al-1Mo-1V (Ti-8-1-1) | 36.0 |
| Titanium Ti-8Al-1Mo-1V (Ti-8-1-1) Annealed 8 hr at 790° C. (1450° F.) | 36.0 |
| Titanium Ti-6Al-4V (Grade 5), Annealed | 36.0 |
| Titanium Ti-6Al-4V (Grade 5), Annealed Bar | 36.0 |
| Titanium Ti-6Al-2Sn-4Zr-6Mo (Ti-6-2-4-6) Annealed | 37.0 |
| Titanium Beta C (Ti-3Al-8V-6Cr-4Mo-4Zr ST 815° C., Aged 510° C. | 38.0 |
| Titanium Ti-6Al-2Sn-4Zr-6Mo (Ti-6-2-4-6) STOA | 38.0 |
| Titanium Ti-6Al-6V-2Sn (Ti-6-6-2) Annealed | 38.0 |
| Titanium Ti-7Al-4Mo, STA | 38.0 |
| ATI Allvac ® 6-2-4-6 Titanium Alloy, Heat Treatment: 885° C. (1625° F.) + Age | 38.0 |
| ATI Allvac ® Ti-17 Titanium Alloy, Heat Treatment: 899° C. (1650° F.) + Age | 38.0 |
| Titanium Ti-13V-2.7Al-7Sn-2Zr, ST 815° C., Aged 540° C. (1000° F.) | 39.0 |
| Titanium Ti-6Al-2Sn-4Zr-6Mo (Ti-6-2-4-6) STA-1 | 39.0 |
| Titanium Ti-6Al-2Sn-4Zr-6Mo (Ti-6-2-4-6) STA-2 | 39.0 |
| Titanium Ti-6Al-2Sn-4Zr-6Mo (Ti-6-2-4-6) BSTA | 39.0 |
| Titanium Ti-6Al-4V (Grade 5), STA Bar | 39.0 |
| Titanium Ti-10V-2Fe-3Al (Ti 10-2-3) ST 760° C.; Age 525° C. (980° F.) | 40.0 |
| Titanium Ti-11.5Mo-6Zr-4.5Sn, ST 720° C., Aged 495° C. | 40.0 |
| Titanium Ti-8Mo-8V-2Fe-3Al ST 800° C., Aged 540° C. (1000° F.) | 40.0 |
| Titanium Ti-5-5-8-3 (Ti-5Mo-5V-8Cr-3Al), 1 to 3 mm Sheet | 40.0 |
| Titanium Ti-5Al-2Sn-2Zr-4Mo-4Cr (Ti-17) Alpha-Beta Processed | 40.0 |
| Titanium Ti-5Al-2Sn-2Zr-4Mo-4Cr (Ti-17) Beta Processed | 40.0 |
| Titanium Ti-6Al-4V (Grade 5), STA | 41.0 |
| Titanium Ti-13V-11Cr-3Al (Ti-13-11-3) Aged 400° C. | 42.0 |
| Titanium Ti-6Al-6V-2Sn (Ti-6-6-2) STA 870° C./565° C. | 42.0 |
| Titanium Ti-13V-11Cr-3Al; (Ti-13-11-3) Annealed 850° C. (1560° F.) + Aged 510° C. 8 hr | 43.0 |
| Titanium Ti-13V-2.7Al-7Sn-2Zr, ST 760° C., Aged 440° C. | 44.0 |
| Titanium Ti-6Al-6V-2Sn (Ti-6-6-2) STA 910° C./540° C. (1000° F.) | 44.0 |
| Titanium Ti-13V-11Cr-3Al (Ti-13-11-3) SolnTreat; Age 450° C. | 46.0 |
| Titanium Ti-13V-11Cr-3Al (Ti-13-11-3) Aged 490° C. | 50.0 |

The most preferred titanium for use as the extension members, rivets and spacer elements in the present invention has a hardness of HRC 35 or higher. Such a material can be found in a Grade 5 titanium alloy (Ti-6Al-4V).

The specific shape of the rod member can exhibit a round or rectangular cross section, but a preferred shape exhibits a cross sectional diameter or length of 8 mm or more, preferably a diameter within the range of 10-20 mm. Such a shape and diameter are sufficiently hard and exhibit such a high tensile strength that they are not readily cut by bolt cutters or saws (hand-operated or battery-operated). Such dimensions and hardness are also a visual deterrent for those intent on using a portable angle grinder that may serve as a psychological deterrent and redirect the would-be thief toward other lock systems that do not have such a robust system.

The ultimate tensile strength of the titanium alloy can also be used as an indicator for suitability in the present invention. This tensile strength may help avoid potential variances due to surface absorption of oxygen from annealing. An exemplary listing of the ultimate tensile strengths of various titanium alloys is found in Table 3.

TABLE 3

| Alloy | Designation | Tensile Strength (MPa) |
|---|---|---|
| Commercially Pure | ASTM Grade 1 | 241 |
| Commercially Pure | ASTM Grade 2 | 345 |
| Commercially Pure | ASTM Grade 3 | 448 |
| Commercially Pure | ASTM Grade 4 | 552 |
| Ti-3%Al-2.5%V | ASTM Grade 9 | 621 |
| Ti-0.8%Ni-0.3%Mo | ASTM Grade 12 | 483 |
| Ti-3%Al-8%V-6%Cr-4%Zr-4%Mo | Beta C | 1172 |
| Ti-15%Mo-3%Nb-3%Al-0.2%Si | Timetal 21 S[a] | 792 |
| Ti-6%Al-4%V | ASTM Grade 5 | 897 |
| Ti-2.5%Cu | IMI 230 | 540 |
| Ti-4%Al-4%Mo-2%Sn-0.5%Si | IMI 550 | 1104 |
| Ti-6%Al-6%V-2%Sn | | 1035 |
| Ti-10%V-2%Fe-3%Al | | 1241 |
| Ti-15%V-3%Cr-3%Sn-3%Al | | 1000 |
| Ti-8%Al-1%Mo-1%V | | 897 |
| Ti-6%Al-5%Zr-0.5%Mo-0.2%Si | IMI 685 | 850 |
| Ti-6%Al-2%Sn-4%Zr-2%Mo | | 931 |
| Ti-6%Al-2%Sn-4%Zr-6%Mo | | 1172 |
| Ti-5.5%Al-3.5%Sn-3%Zr-1%Nb-0.3%Mo-0.3%Si | IMI 829 | 960 |
| Ti-5.8%Al-4%Sn-3.5%Zr-0.7%Nb-0.5%Mo-0.3%Si | IMI 834 | 1030 |

[a]Solution treated

An ultimate tensile strength of 700 MPa or more (at 20° C.) is preferred for the titanium members and parts use in the present invention. Even more preferable is a tensile strength of about 930 MPA or more.

The specific shape of the rod member can exhibit any number of potential geometric shapes in cross section, e.g., round, triangular, rectangular, hexagonal, octagonal, etc. provided that the cross sectional distance is sufficiently large to be impractical to cut with handheld bolt cutters, e.g., a cross sectional distance of at least 8 mm, preferably a cross sectional distance within the range of 9-20 mm, and even more preferably a cross sectional distance of 10-14 mm. A preferred shape uses commercially available rod stock that exhibits a cross sectional diameter within the range of 8-12 mm.

Figure 2:
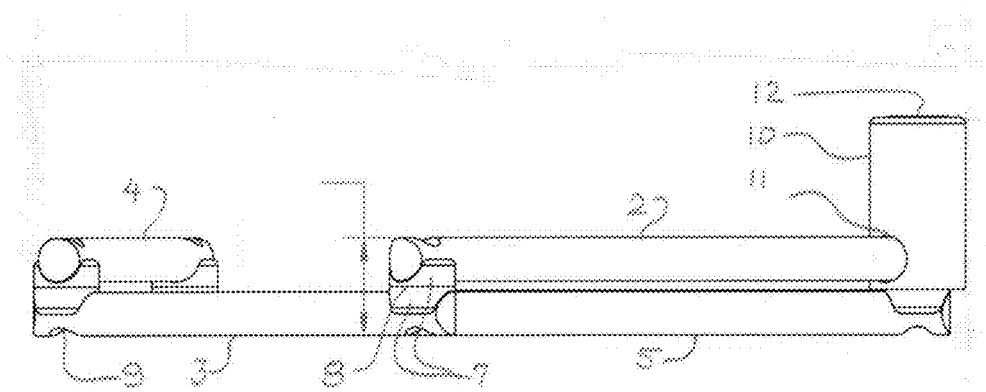
FIG. 2 is a side view of the device shown in FIG. 1.

Turning now to the figures, FIGS. 1 and 2 shows an antitheft device 1 according to the invention. Two extension rod members 3, 4 (also called "first rod members" herein) are interconnected with each other and with locked rod member 5 (referenced as "third rod member" herein) and lockable rod member 2 (referred to as "second rod member" herein) at first ends 6. Any number of extension rods 3, 4 may be used to provide additional length to antitheft device 1.

An opposing pair of saddle washers 7 have an arcuate side that contacts the round external surfaces of each rod and an opposing flat or planar side that provides a planar interaction surface 8 in which each rod can pivot relative to the rod with which it is connected by rivet 9, e.g., between rod 2 and rod 3. Saddle washers 7 also serve to protect rivets 9 from attack using the connected rods as cutting guides by a saw blade or bolt cutter jaws.

Figure 13:
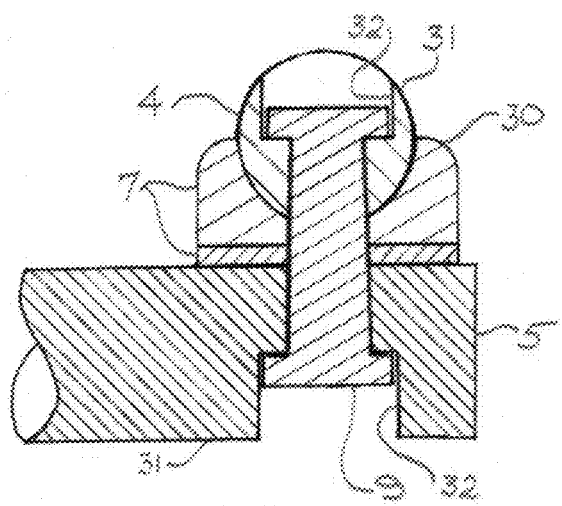
FIG. 13 is a cross sectional view showing the connection of FIG. 12.

Locked rod member 5 is permanently secured to lock 10. Lockable rod member 2 can become secured by lock 10 when lockable rod 2 is inserted into lock hole 11 and lock mechanism 12 is engaged. See also FIG. 13.

Figure 3:
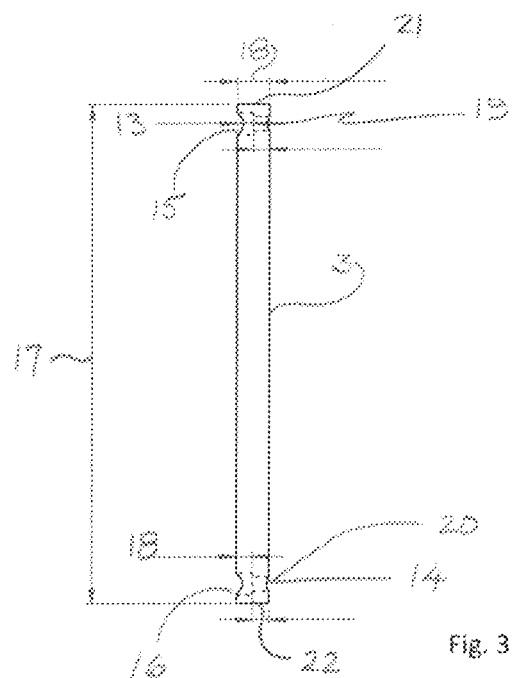
FIG. 3 illustrates additional details of an extension arm member.
Figure 4:
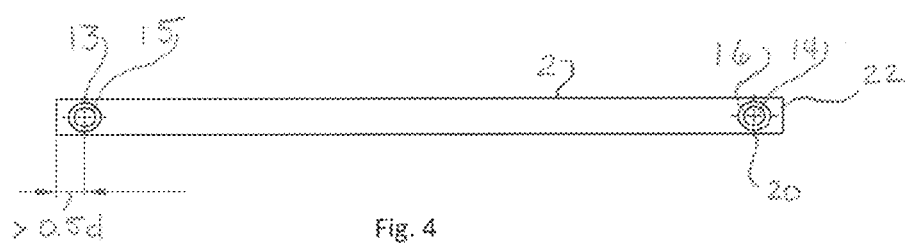
FIG. 4 depicts a lockable arm member.
Figure 5:
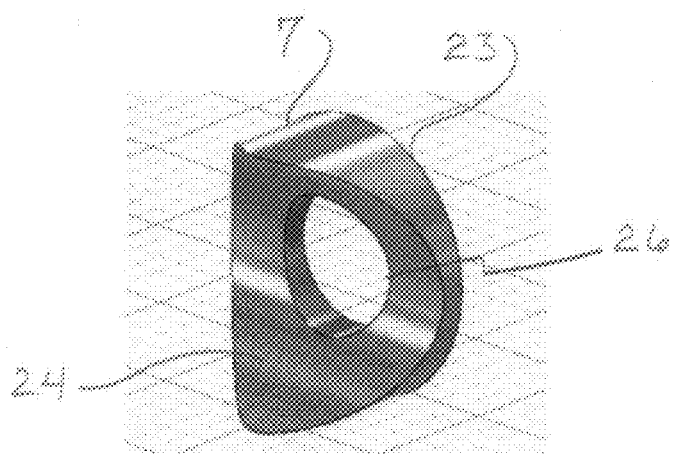
FIG. 5 is an isometric view of a saddle-shaped washer.

FIGS. 3 and 4 show additional details of extension rod 3. As shown extension rod 3 is cylindrical with a substantially circular cross sectional shape having a length 17 and rod diameter 18. Substantially parallel, transverse bores 13, 14 with countersink bores 15, 16 that exhibit greater diameter than bores 13, 14. Bore centers 19, 20 of bores 13, 14 respectively are desirably located at least one third and preferably at least one half of a rod diameter from the terminal ends 21, 22 of rod 3.

FIGS. 5-13 illustrate additional details of the saddle washers 7 and the pivotable connections between connected rods, e.g., extension rods 3, 4. As shown, saddle washer 7 has a planar side 23 and an arcuate side 24. Arcuate side 24 preferably exhibits a radius of curvature 25 that is substantially the same as rods 3, 4 to provide a good fit. Washers 7 also exhibit a transverse bore 26 having a close tolerance fit for securing rivet 9 without undue play between rivet 9 and spacer 7 when assembled.

Figure 6:
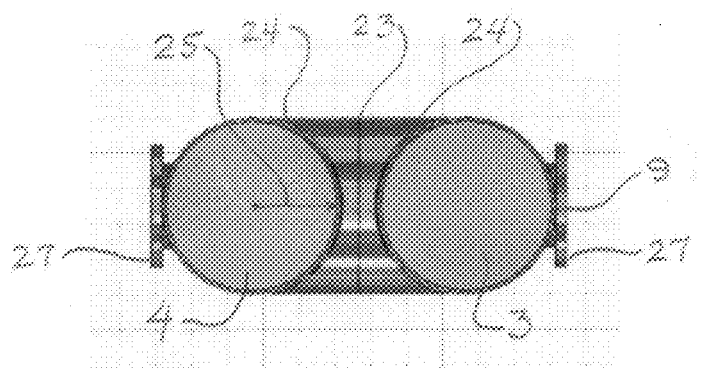
FIG. 6 is an end view of a connection between extension arm members in which opposing saddle-shaped spacers form a pivot plane and a deformed rivet permanently connects the arm members.
Figure 7:
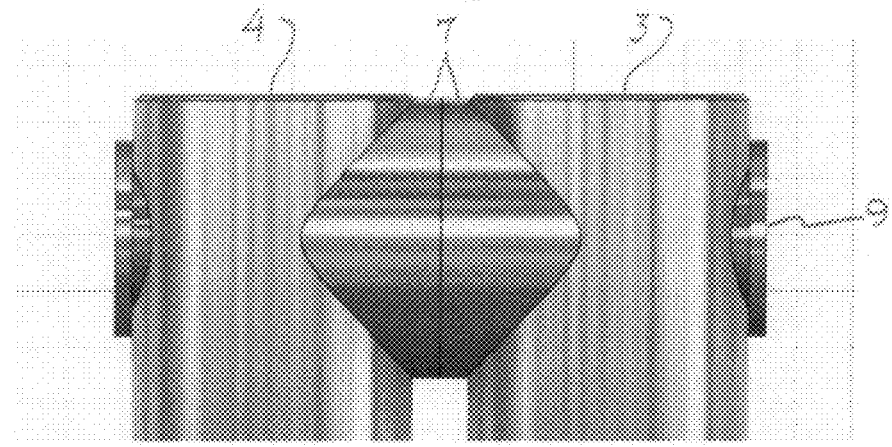
FIG. 7 is a side view of the connection shown in FIG. 6.
Figure 8:
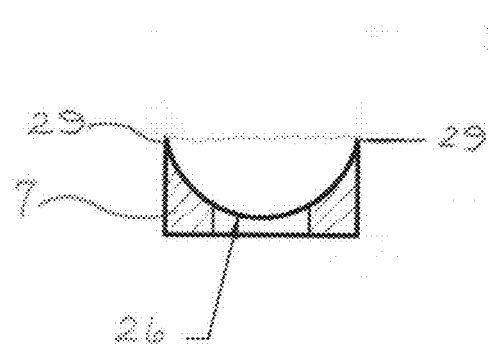
FIGS. 8-10 depict side, bottom and isometric views, respectively, of a saddle washer used in the invention.
Figure 9:
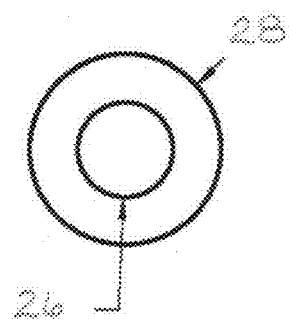
Figure 10:
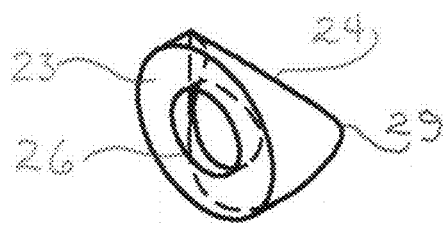
Figure 11:
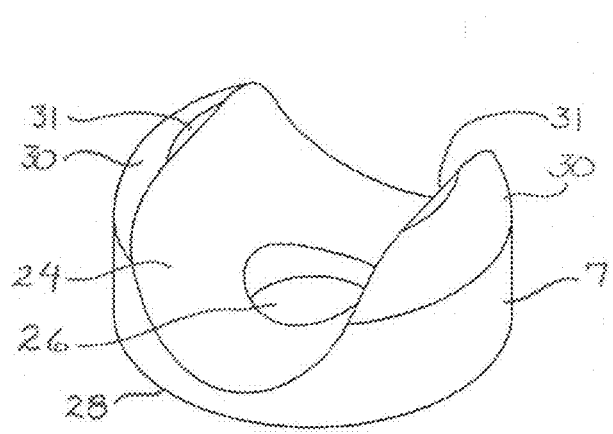
FIG. 11 presents a saddle washer having two bevels or chamfers to round off the upstanding edges of the arcuate side.
Figure 12:
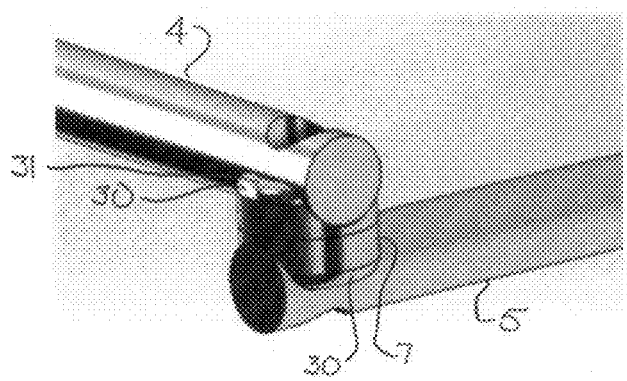
FIG. 12 is a view of a joint connection using two, opposing, rounded off saddle washers to form a planar connection between an extension arm and the locking arm.

As shown in FIGS. 6 and 7, the ends of rivet 9 are exposed above the outer diameter of rods, 3, 4. While exposed ends are operative to secured rods 3, 4 together they also provide a potential vulnerability for attack by a portable angle grinder that might remove the deformation flanges 27 on either end of rivet 9. To that end, rivet 9 may also be set at or below the outer surface 31 of the connected rods, e.g., rods 4 and 5, in countersink boring 32.

The outer diameter 28 of spacer 7 may be the same or substantially the same as the rod diameter 18. The rising edges 29 of washer 7 can present a sharp edge for users. First and/or second chamfers 30, 31 can be used to reduce incidents of cutting or snagging at edges 29 while also retaining the security and planar motion features of saddle washers 7 between connected rods.

Figure 14:
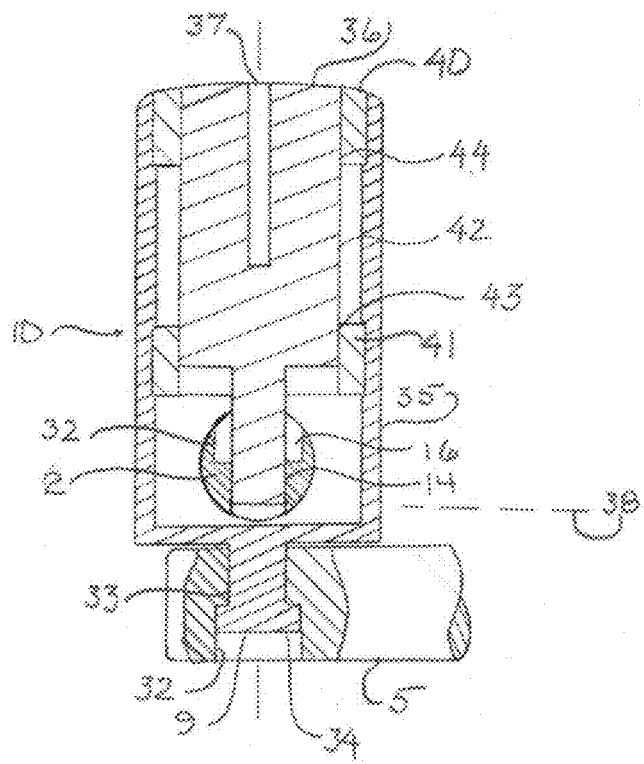
FIG. 14 is a sectional view of the lock connecting the locked arm and the lockable arm.
Figure 15:
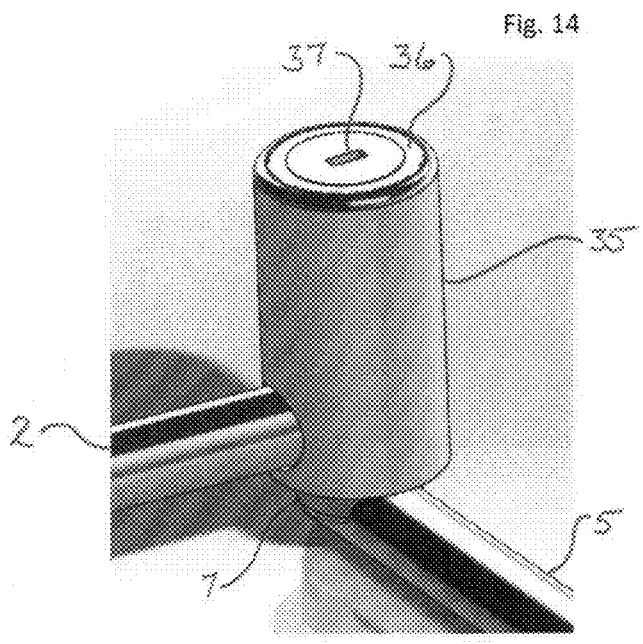
FIG. 15 is an external view of the connection shown in FIG. 14.

FIGS. 14 and 15 illustrate additional details of lock 10. As shown, distal end 33 of lock body 35 extends through rod 5 and into countersink bore 32 where it is deformed in-situ to make enlarged end 34 that permanently holds lock body 35 to locking rod 5.

Within lock body 35, locking member 36 is able to be removed vertically and axially from within lock body 35 by operation of a key (not shown) in keyhole 37 from a secured position 38 to an unsecured position (not shown). Locking member 36 also exhibits a distal pin that engages the transverse bore 14 of lockable rod 2 when in secured position 38 and disengages from rod 2 when moved axially within lock body 35 or removed completely from lock body 35. Secured bushings 40, 41 within lock body 35 are used to center and secured locking member 36 within lock body 35. Preferably, the external surface 42 of locking member 36 and the corresponding internal surfaces 43, 44 of bushings 40, 41 exhibit mating threads that allow locking member 36 to be threaded into and secured within lock body 35.

Figure 16:
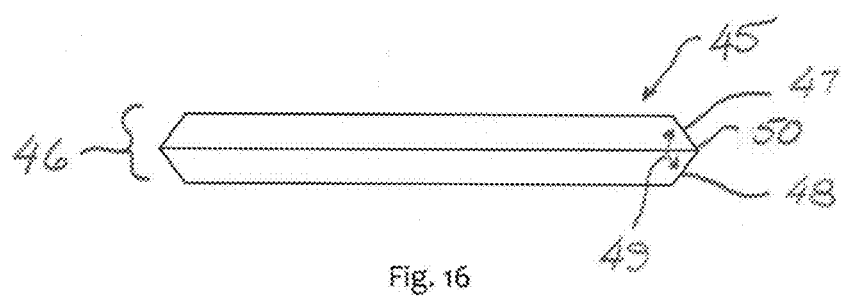
FIG. 16 depicts a security washer that may be used between opposing saddle washers to shield the space between saddle washers from insertion of a blade or prying tool.
Figure 17:
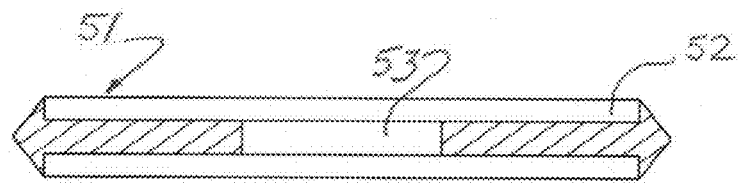
FIG. 17 is a cross sectional view of the security washer of FIG. 16.
Figure 18:
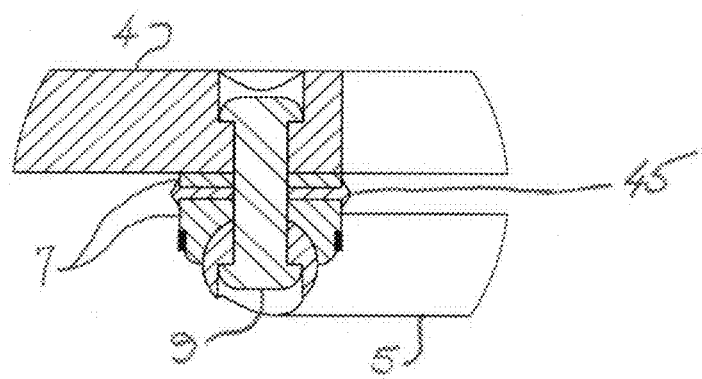
FIG. 18 shows the security washer in place between opposing saddle washers at a pivotable connection of the invention.

FIGS. 16-18 illustrate the optional use of a security washer 45 between opposing saddle washers 7. Preferably, at least one security washer is used in the antitheft device according to the invention and even more preferably a security washer is used at each joint connection in the device. Security washer 45 preferably exhibits a shaped radial edge 46, such as counter-sloping sections 47, 48 that meet in an acute or obtuse angle 49 at substantially the vertical mid-point 50 of the height of security washer 45. Such a profile shape makes it more difficult for a blade or saw edge to attack the joint at the intersection of the opposing saddle washers 7. The inner area 51 of security washer 45 preferably has opposing countersink portions 52 to receive saddle washers 7 and centered on a central bore 53 for passing rivet 9 therethrough.

The foregoing illustrations and descriptions are not intended to serve as limitations on the scope of the appended claims.

Each of the patents and published applications that have been cited herein are hereby incorporated by reference.

What is claimed is:

1. An antitheft device comprising a plurality of interlinked arm members, each of which exhibits a cross sectional distance of 8 mm or more;
   at least one pair of opposing, saddle washers between at least one interconnection of two arm members;
   at least one security washer exhibiting opposing countersink portions therein that receive a saddle washer on each side thereof, wherein each security washer exhibits a shaped profile edge comprising counter-sloping sections that meet in an acute or obtuse angle at substantially a vertical mid-point of said security washer.

2. An antitheft device according to claim 1 wherein each of said arm members exhibits a hardness within the range of HRC 30-68.

3. An antitheft device according to claim 1 further comprising a lock secured to one of the arm members and exhibiting an opening into which a second arm member can be inserted and secured therein.

4. An antitheft device according to claim 1 wherein each saddle washer exhibits a hardness at least as high as HRC 30.

5. An antitheft device according to claim 1 further comprising a rivet exhibiting a hardness of at least HRC 30, said rivet connecting a pair of said arm members.

6. An antitheft device according to claim 1 wherein the arm member include:
   (a) a plurality of first rod members exhibiting a transverse hole at each end of said rod member;
   (b) a plurality of saddle washers exhibiting a curved concave side that fits over ends of said first rod members, a planar side opposite said curved side, and a transverse opening through said planar side and said curved side and dimensioned to allow a rivet to pass therethrough and connect said first rod members in a pivotable joint on a plane where planar sides of opposing saddle washers meet;
   (c) a second rod member exhibiting a transverse hole at each end of said second rod member, wherein a first end of said second rod member is connected to an end of a first rod member by a rivet and said saddle washers in a planar, pivotable joint,
   (d) a third rod member exhibiting a transverse hole at each end of said third rod member, wherein a first end of said third rod member is connected to an end of a first rod member by a rivet and said saddle washers in a planar, pivotable joint,
   wherein each of the rivets is dimensioned to pass through the holes at each end of two rod members as well as the saddle washers located between the rod members, and wherein each rivet is deformed in place so as to permanently connect the ends of said first two rod members in a planar, pivotable joint; and (e) a locking device that is permanently secured to a second end of the third rod member through said transverse hole in said second end, said locking device exhibiting a lateral opening dimensioned to receive and lockably secure a second end of said second rod member, wherein each of the rod members, saddle washers, and rivets exhibits a hardness of at least 30 HRC.

7. An antitheft device according to claim 6 wherein all rod members exhibit a circular cross section profile and have a diameter of at least 10 mm.

8. An antitheft device comprising:

a plurality of interlinked arm members, each of which exhibits a cross sectional distance of 8 mm or more;

at least one pair of opposing, saddle washers between at least one interconnection of two arm members, at least one security washer exhibiting opposing countersink portions therein that receive a saddle washer on each side thereof; and a lock secured to one of the arm members and exhibiting an opening into which a second arm member can be inserted and secured therein.

9. An antitheft device according to claim 8 wherein the arm member include:

(a) a plurality of first rod members exhibiting a transverse hole at each end of said rod member;

(b) a plurality of saddle washers exhibiting a curved concave side that fits over ends of said first rod members, a planar side opposite said curved side, and a transverse opening through said planar side and said curved side and dimensioned to allow a rivet to pass therethrough and connect said first rod members in a pivotable joint on a plane where planar sides of opposing saddle washers meet;

(c) a second rod member exhibiting a transverse hole at each end of said second rod member, wherein a first end of said second rod member is connected to an end of a first rod member by a rivet through said saddle washers in a planar, pivotable joint, (d) a third rod member exhibiting a transverse hole at each end of said third rod member, wherein a first end of said third rod member is connected to an end of a first rod member by a rivet through said saddle washers in a planar, pivotable joint, wherein each of said rivets is dimensioned to pass through holes at each end of two rod members as well as saddle washers located between rod members, and each rivet has been deformed in place so as to permanently connect ends of rod members in a planar, pivotable joint; and (e) wherein the lock includes a locking device that is permanently secured to a second end of the third rod member through said transverse hole in said second end, said locking device exhibiting a lateral opening dimensioned to receive and lockably secure a second end of said second rod member, wherein each of the rod members, saddle washers, and rivets exhibits a hardness of at least 30 HRC.

10. An antitheft device according to claim 9 wherein all rod members exhibit a circular cross section profile and have a diameter of at least 10 mm.

* * * * *